(12) United States Patent
Park et al.

(10) Patent No.: US 11,747,880 B2
(45) Date of Patent: Sep. 5, 2023

(54) METHOD AND DEVICE FOR DETERMINING COMPENSATION FOR TOUCH DATA ON BASIS OF OPERATING MODE OF DISPLAY

(71) Applicant: Samsung Electronics Co., Ltd., Suwon-si (KR)

(72) Inventors: Jongdae Park, Suwon-si (KR); Hoondo Heo, Suwon-si (KR); Minuk Kim, Suwon-si (KR); Jungwon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 17/289,980

(22) PCT Filed: Nov. 1, 2019

(86) PCT No.: PCT/KR2019/014756
§ 371 (c)(1),
(2) Date: Apr. 29, 2021

(87) PCT Pub. No.: WO2020/091530
PCT Pub. Date: May 7, 2020

(65) Prior Publication Data
US 2022/0004244 A1  Jan. 6, 2022

(30) Foreign Application Priority Data
Nov. 2, 2018  (KR) .................... 10-2018-0133350

(51) Int. Cl.
*G06F 1/3231*  (2019.01)
*G06F 1/3228*  (2019.01)
(Continued)

(52) U.S. Cl.
CPC .......... *G06F 1/3231* (2013.01); *G06F 1/3228* (2013.01); *G06F 3/044* (2013.01);
(Continued)

(58) Field of Classification Search
CPC ...... G06F 1/3262; G06F 3/0412; G06F 3/044; G06F 3/0486; G06F 1/3231;
(Continued)

(56) References Cited

U.S. PATENT DOCUMENTS

| 2010/0110040 | A1 | 5/2010 | Kim et al. |
| 2013/0176273 | A1 | 7/2013 | Li et al. |
| 2018/0088733 | A1* | 3/2018 | Syed ..................... G06F 1/3215 |

FOREIGN PATENT DOCUMENTS

| JP | 2012-128786 A | 7/2012 |
| JP | 2015-011497 A | 1/2015 |

(Continued)

*Primary Examiner* — Yaron Cohen
(74) *Attorney, Agent, or Firm* — Jefferson IP Law, LLP

(57) ABSTRACT

Disclosed in various embodiments of the present invention are a method and a device, the device comprising a touch sensing module, a memory and a processor, wherein the processor is configured to detect a touch input while a low-power display mode is driven, store, in the memory, touch data corresponding to the detected touch input, change the low-power display mode to another designated mode, reset a touch baseline of the touch sensing module in response to the mode change, and compensate for the touch strength of the stored touch data at least on the basis of the designated mode. Various embodiments are possible.

13 Claims, 11 Drawing Sheets

(51) Int. Cl.
   *G06F 3/041* (2006.01)
   *G06F 3/044* (2006.01)
   *G06F 3/0486* (2013.01)
   *G06F 3/0488* (2022.01)
(52) U.S. Cl.
   CPC .......... *G06F 3/0412* (2013.01); *G06F 3/0486* (2013.01); *G06F 3/0488* (2013.01); *G06F 2203/04105* (2013.01)
(58) Field of Classification Search
   CPC .. G06F 1/3228; G06F 3/04186; G06F 3/0488; G06F 2203/04105; Y02D 30/50
   See application file for complete search history.

(56) References Cited

FOREIGN PATENT DOCUMENTS

| | | |
|---|---|---|
| KR | 10-2011-0042585 A | 4/2011 |
| KR | 10-2016-0009291 A | 1/2016 |
| KR | 10-1637900 B1 | 7/2016 |

\* cited by examiner

FIG. 5

METHOD AND DEVICE FOR DETERMINING COMPENSATION FOR TOUCH DATA ON BASIS OF OPERATING MODE OF DISPLAY

TECHNICAL FIELD

Various embodiments of the disclosure disclose a method and an apparatus for determining compensation of touch data based on an operation mode of a display.

BACKGROUND ART

With the development of digital technology, various types of electronic devices, such as a mobile communication terminal, a personal digital assistant (PDA), an electronic notebook, a smart phone, a tablet personal computer (PC), and a wearable device, have been widely used. For functional support and increase of such electronic devices, hardware parts and/or software parts of the electronic devices have been continuously improved.

Further, an electronic device may be designed to operate limited resources efficiently (e.g., process, memory, or power). For example, since the biggest cause of battery consumption is to turn on a display, the display is turned off to reduce the battery consumption in case that the electronic device is not in use for longer than a predetermined time. However, it becomes more frequent for a user to turn on the display of the electronic device in order to check the time, and thus there is a limit to battery saving. In order to compensate for such shortcomings, the electronic device provides a function (e.g., always on display (AOD)) of displaying information, such as clock, calendar, and image, even in a low-power display state.

DISCLOSURE

Technical Problem

In case that a touch is detected in a low-power state of the display, the electronic device may reset a touch baseline (e.g., capacitor value related to touch detection) before changing the display state to a display-on state. If the baseline is not reset when a display mode is switched, an analog front end (AFE) value may be distorted, and malfunction may occur by influence of display noises, so that the baseline reset may be absolutely necessary. However, if the baseline is reset, the electronic device redetects the touch sensed in the low-power state of the display after resetting the baseline, and a drag recognition error may occur during a touch drag. For example, if the baseline is reset, there may be a problem in that the electronic device misrecognizes a start position of the drag, or is unable to recognize a part of a drag path (e.g., drag cutoff).

Various embodiments disclose a method and an apparatus, which can store, if a touch input is detected in a low-power display mode, touch data corresponding to the detected touch input, and compensate for a touch strength using the stored touch data after resetting a touch baseline.

Solution to Problem

According to various embodiments, an electronic device may include a touch sensing module, a memory, and a processor, wherein the processor is configured to detect a touch input while driving a low-power display mode, store, in the memory, touch data corresponding to the detected touch input, change the low-power display mode to a predetermined mode different from the low-power display mode, reset a touch baseline of the touch sensing module corresponding to the mode change, and compensate for a touch strength of the stored touch data at least based on the predetermined mode.

According to various embodiments, an electronic device may include a sensor, a memory, and a processor, wherein the processor is configured to detect sensor data using the sensor while driving a low-power display mode, switch the low-power display mode to a normal display mode, and perform a function based on the sensor data.

According to various embodiments, a method for operating an electronic device may include driving a low-power display mode, detecting a touch input, storing touch data corresponding to the detected touch input, changing the low-power display mode to a predetermined mode different from the low-power display mode, resetting a touch baseline corresponding to the mode change, and compensating for a touch strength of the stored touch data at least based on the predetermined mode.

Advantageous Effects of Invention

According to the various embodiments, it is possible to improve the touch recognition by storing, if the touch input is detected in the low-power display mode, the touch data corresponding to the detected touch input and compensating for the touch strength using the stored touch data after resetting the touch baseline.

According to the various embodiments, it is possible to reduce the touch recognition error while switching the display mode by compensating for the touch strength corresponding to the normal display mode if the display mode is switched from the low-power display mode to the normal display mode.

BRIEF DESCRIPTION OF DRAWINGS

FIG. 5 is a diagram illustrating an example in which an electronic device senses a touch according to a comparative example.

MODE FOR THE INVENTION

Figure 1:
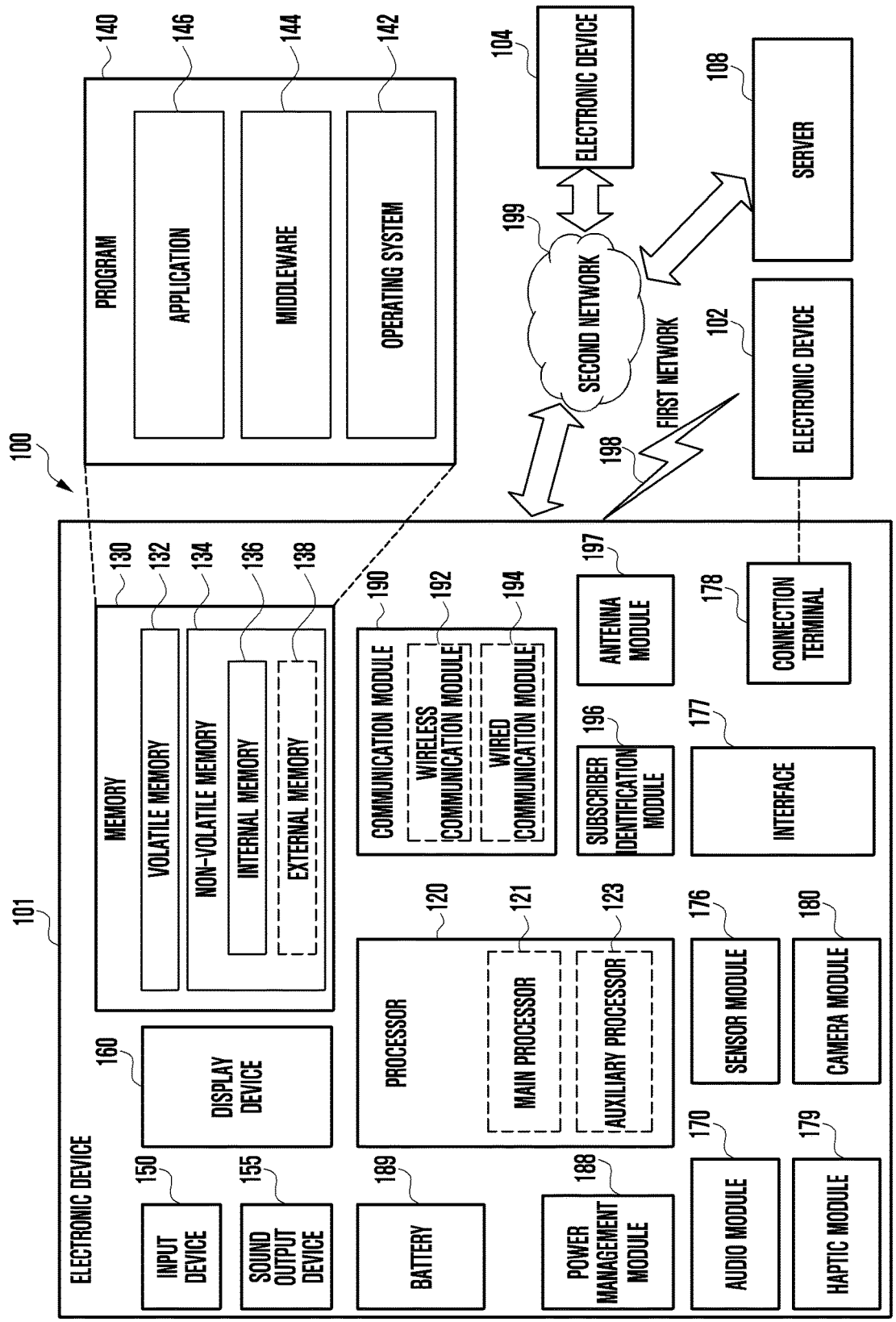
FIG. 1 is a block diagram of an electronic device 101 in a network environment 100, which determines compensation of touch data based on an operation mode of a display, according to various embodiments.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combinations thereof and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
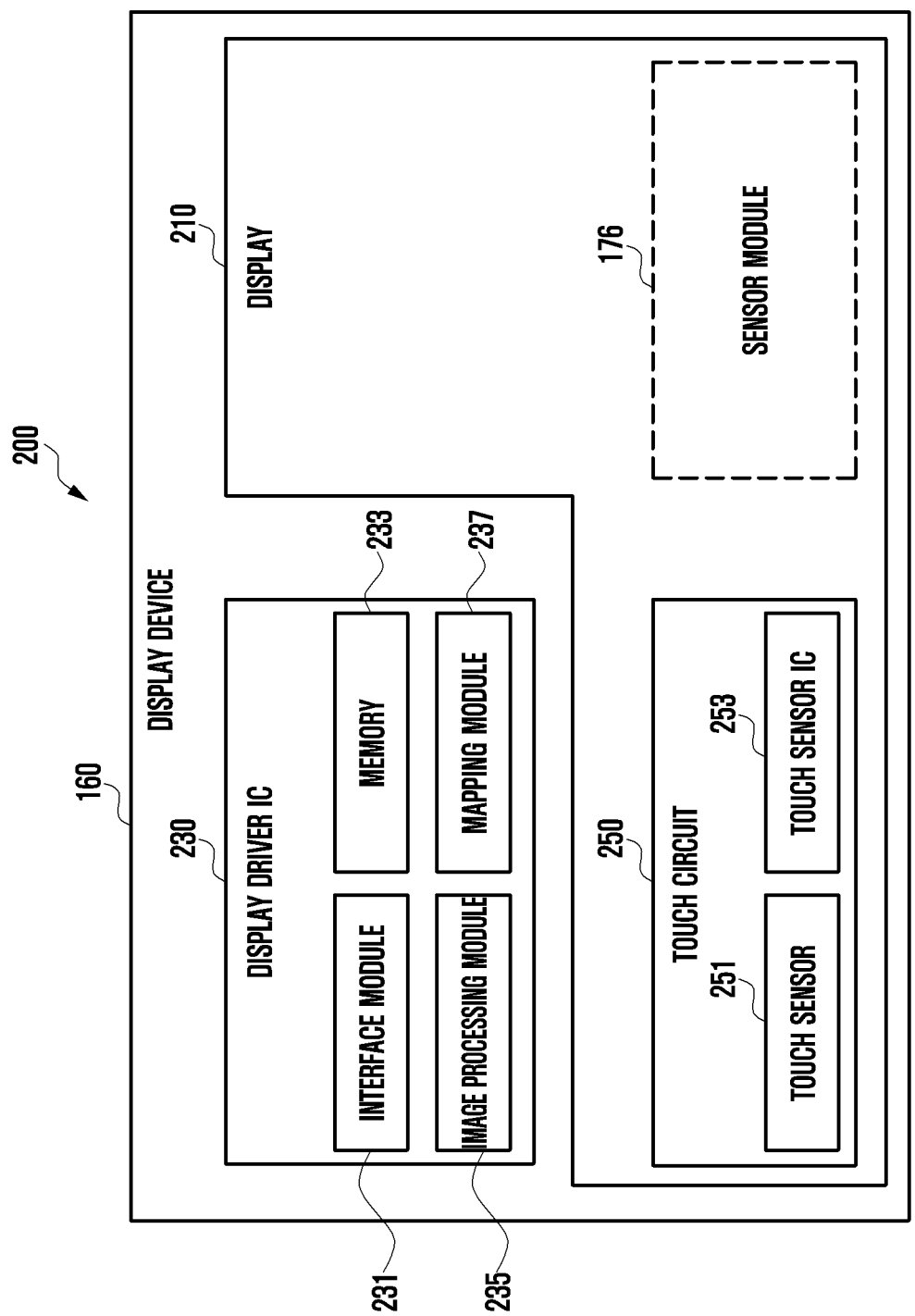
FIG. 2 is a block diagram 200 of a display device 160, which determines compensation of touch data based on an operation mode of a display, according to various embodiments.

FIG. 2 is a block diagram 200 illustrating the display device 160 according to various embodiments.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121.

The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
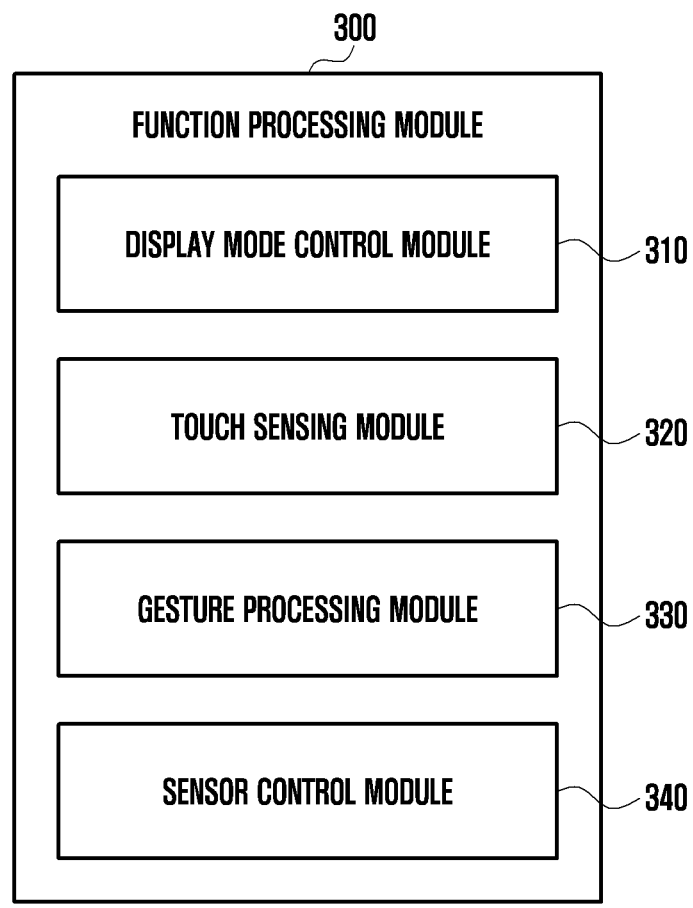
FIG. 3 is a diagram illustrating an example of a function processing module of an electronic device according to various embodiments.

FIG. 3 is a diagram illustrating an example of a function processing module of an electronic device according to various embodiments.

Referring to FIG. 3, a function processing module 300 may be included in a processor (e.g., processor 120 of FIG. 1) including a processing circuitry as a hardware module or a software module. The function processing module 300 may include a display mode control module 310, a touch sensing module 320, a gesture processing module 330, and a sensor control module 340.

The display mode control module 310 (e.g., DDI 230 of FIG. 2) may control a display mode (or display operation mode). The display mode may be classified into a low-power display mode and a normal display mode. An electronic device is designed to operate limited resources efficiently (e.g., process, memory, or power). Accordingly, if a touch input is not detected for longer than a reference time (e.g., 30 seconds or 1 minute), the electronic device turns off a display (e.g., display device 160 of FIG. 1) or reduces battery consumption through switching to a low-power state.

The normal display mode corresponds to a display-on state, and may mean a state in which the display device 160 is turned on and is activated. In case that a user uses the electronic device 101, the display mode control module 310 may be driven in the normal display mode. The normal display mode may include detailed modes according to the status (e.g., external illumination, display settings (e.g., luminance), or voltage settings) of the electronic device 101. If the user's use is detected by the touch sensing module 320 (e.g., touch circuit 250 of FIG. 2) or the sensor control module 340 (e.g., sensor module 176 of FIG. 1), the display mode control module 310 may drive the normal display mode. If the user's use is not detected for longer than the reference time, the display mode control module 310 may switch (e.g., change) the normal display mode to the low-power display mode. The display mode control module 310 may notify the touch sensing module 320 or the sensor control module 340 of the switching of the display mode.

The low-power display mode corresponds to a low-power display state, and may mean a state in which the display device 160 is in an inactivated state. The low-power display mode may include a state in which the display (e.g., display device 160 of FIG. 1) is driven with luminance that is equal to or lower than a specified range. Based on various embodiments, the low-power display mode may include detailed modes. According to an embodiment, the low-power display mode may be a case that only some functions (or applications) of the electronic device 101 are activated, and specified kinds of functions are stopped (or ended). In the low-power display mode, battery consumption of the electronic device 101 may be lower than that in the normal display mode. If the user's use is detected by the touch sensing module 320 or the sensor control module 340 while the display is driven in the low-power display mode, the display mode control module 310 may switch the low-power display mode to the normal display mode.

The touch sensing module 320 (e.g., touch circuit 250 of FIG. 2) may detect the touch input. If the touch input is detected during the low-power display mode, the touch sensing module 320 may transfer the detection of the touch input to the display mode control module 310. The touch sensing module 320 may store touch data corresponding to the detected touch input in a memory (e.g., memory 130 of FIG. 1). The touch data may be a value obtained through digital conversion of a capacitor value being detected through the touch input. Although the capacitor value being detected through the touch input is an analog value, the touch sensing module 320 may convert the analog value into a digital value and may store the digital value in the memory 130. The touch data may be stored in the memory 130 in a form including raw data. The touch sensing module 320 may reset a touch baseline. The touch baseline may mean a capacitor value related to the touch detection. The touch sensing module 320 may detect the touch input based on a change of the capacitor value. If the touch baseline is not reset when the display mode is switched, the analog front end (AFE) value may be distorted, and the malfunction may occur by the influence of the display noises.

For example, the capacitor value being detected (or recognized) as the touch input in the low-power display mode may be different from the capacitor value being detected (or recognized) as the touch input in the normal display mode. If the capacitor value being detected in the low-power display mode is equal to or larger than a first threshold value (e.g., 100, 500, or 1000), the touch sensing module 220 may determine that the touch input has occurred, whereas if the capacitor value being detected in the normal display mode is equal to or larger than a second threshold value (e.g., 500, 1000, or 2000), the touch sensing module 220 may determine that the touch input has occurred. The first threshold value may be smaller than the second threshold value. Accordingly, in case that the capacitor value detected in the low-power display mode is not reset, but is maintained "1000" as it is, and thus the touch sensing module 220 may be unable to determined that the touch input has occurred in the normal display mode.

Accordingly, the touch sensing module 320 may reset the touch baseline when the display mode is switched. The touch sensing module 320 may compensate for a touch strength (or touch intensity) using the stored touch data. For example, to compensate for the touch strength may mean to change (e.g., compensate) a capacitor value in the low-power display mode to a value in a range corresponding to a capacitor value in the normal display mode. The touch sensing module 320 may control the touch strength so as to determine the touch input detected in the low-power display mode as the touch input even in the normal display mode by changing the capacitor value so that the capacitor value becomes "2000" using the stored touch data (e.g., capacitor value of "1000"). The touch sensing module 320 may transfer the touch strength compensation to the gesture processing module 330.

According to various embodiments, the touch sensing module 320 may delay the reset of the touch baseline until the touch input is released. For example, if the touch input is detected in the low-power display mode, the touch sensing module 320 may not reset the touch baseline, and if the detected touch input is released, the touch sensing module 320 may reset the touch baseline.

The gesture processing module 330 may process the detected touch input as an effective gesture. For example, after the touch strength compensation, the gesture processing module 330 may process the touch input detected during the low-power display mode as the effective gesture. Further, the gesture processing module 330 may process, as the effective gesture, the touch input (e.g., drag) occurring successively in the touch input (e.g., tap) detected during the low-power display mode. The gesture processing module 330 may perform a function based on the effective gesture.

According to various embodiments, if the low-power display mode is switched to the normal display mode by the sensor data, the gesture processing module 330 may process, as the effective gesture, the touch input detected based on whether the successively detected touch input is within a predetermined distance from the sensor data. The gesture processing module 330 may receive the sensor data transferred from the sensor control module 340. Since the touch input occurring during the low-power display mode is reset, an error may occur in a start position of the touch input detected after the switching from the low-power display mode to the normal display mode. Since the sensor data is not reset differently from the touch input, the gesture processing module 330 may determine the effectiveness of the touch input using the sensor data even after the switching to the normal display mode.

According to various embodiments, if the start position of the touch input is within the predetermined distance from the position where the sensor data is detected, the gesture processing module 330 may process the touch input as the effective gesture. If the start position of the touch input is within the predetermined distance (e.g., 0.5 cm) from the position where the sensor data is detected, the gesture processing module 330 may determine that the error has occurred in the start position of the touch input. The gesture processing module 330 may determine that the touch input is a series of intentional actions, and may process the touch input as the effective gesture.

According to various embodiments, if the start position of the touch input is not within the predetermined distance from the position where the sensor data is detected, the gesture processing module 330 may disregard the touch input. If the start position of the touch input is not within the predetermined distance (e.g., 1 cm) from the position where the sensor data is detected, the gesture processing module 330 may determine that the touch input is not a series of intentional actions, and may disregard the touch input.

According to various embodiments, the gesture processing module 330 may determine whether the sensor data is effective after the switching to the normal display mode. For example, since the sensor data is not reset even after the display mode switching, the gesture processing module 330 may determine whether the sensor data is detected even after the switching to the normal display mode. If the sensor data is detected, the gesture processing module 330 may process the touch input detected after the switching to the normal display mode as the effective gesture. If the sensor data is not detected after the switching to the normal display mode, the gesture processing module 300 may disregard the touch input detected after the switching to the normal display mode.

The sensor control module 340 (e.g., sensor module 176 of FIG. 1) may detect the sensor data. The sensor control module 340 may detect the sensor data from a fingerprint sensor or a force sensor. If the sensor data is detected through the specified sensor during the low-power display mode, the sensor control module 340 may determine that a user has requested the display mode switching. The sensor control module 340 may transfer the detection of the sensor data to the display mode control module 310 or the gesture processing module 330.

According to various embodiments, an electronic device (e.g., electronic device 101 of FIG. 1) may include a touch sensing module (e.g., touch circuit 250 of FIG. 2 or touch sensing module 320 of FIG. 3), a memory (e.g., memory 130 of FIG. 1), and a processor (e.g., processor 120 of FIG. 1), wherein the processor is configured to: detect a touch input while driving a low-power display mode, store, in the memory, touch data corresponding to the detected touch input, change the low-power display mode to a predetermined mode different from the low-power display mode, reset a touch baseline of the touch sensing module corresponding to the mode change, and compensate for a touch strength of the stored touch data at least based on the predetermined mode.

The predetermined mode may include a normal display mode, and the processor may be configured to switch the low-power display mode to the normal display mode after storing the touch data.

The processor may be configured to change a capacitor value in the low-power display mode to a value in a range corresponding to a capacitor value in the predetermined mode based on the touch data.

The processor may be configured to perform a function based on a touch gesture being input after the touch strength is compensated for.

If the detected touch input is released, the processor may be configured to switch the low-power display mode to the predetermined mode.

The processor may be configured to delay the touch baseline reset in case that the touch input is detected while driving the low-power display mode, and to reset the touch baseline in case that the detected touch input is released.

The processor may be configured to switch the low-power display mode to the predetermined mode in case that the touch input is detected while driving the low-power display mode, and to perform a function based on the released position in case that the detected touch input is released.

According to various embodiments, an electronic device (e.g., electronic device 101 of FIG. 1) may include a sensor (e.g., sensor module 176 of FIG. 1), a memory (e.g., memory 130 of FIG. 1), and a processor (e.g., processor 120 of FIG. 1), wherein the processor is configured to: detect sensor data using the sensor while driving a low-power display mode, switch the low-power display mode to a normal display mode, and perform a function based on the sensor data.

The processor may be configured to: detect a touch input after switching to the normal display mode, and process the touch input as an effective gesture based on whether the touch input is within a predetermined distance from the sensor data.

The processor may be configured to: process the touch input as the effective gesture in case that the touch input is within the predetermined distance from the sensor data, and perform a function corresponding to the effective gesture.

The processor may be configured to: detect the touch input after switching to the normal display mode, and process the touch input as an effective gesture based on whether the sensor data is detected.

Figure 4:
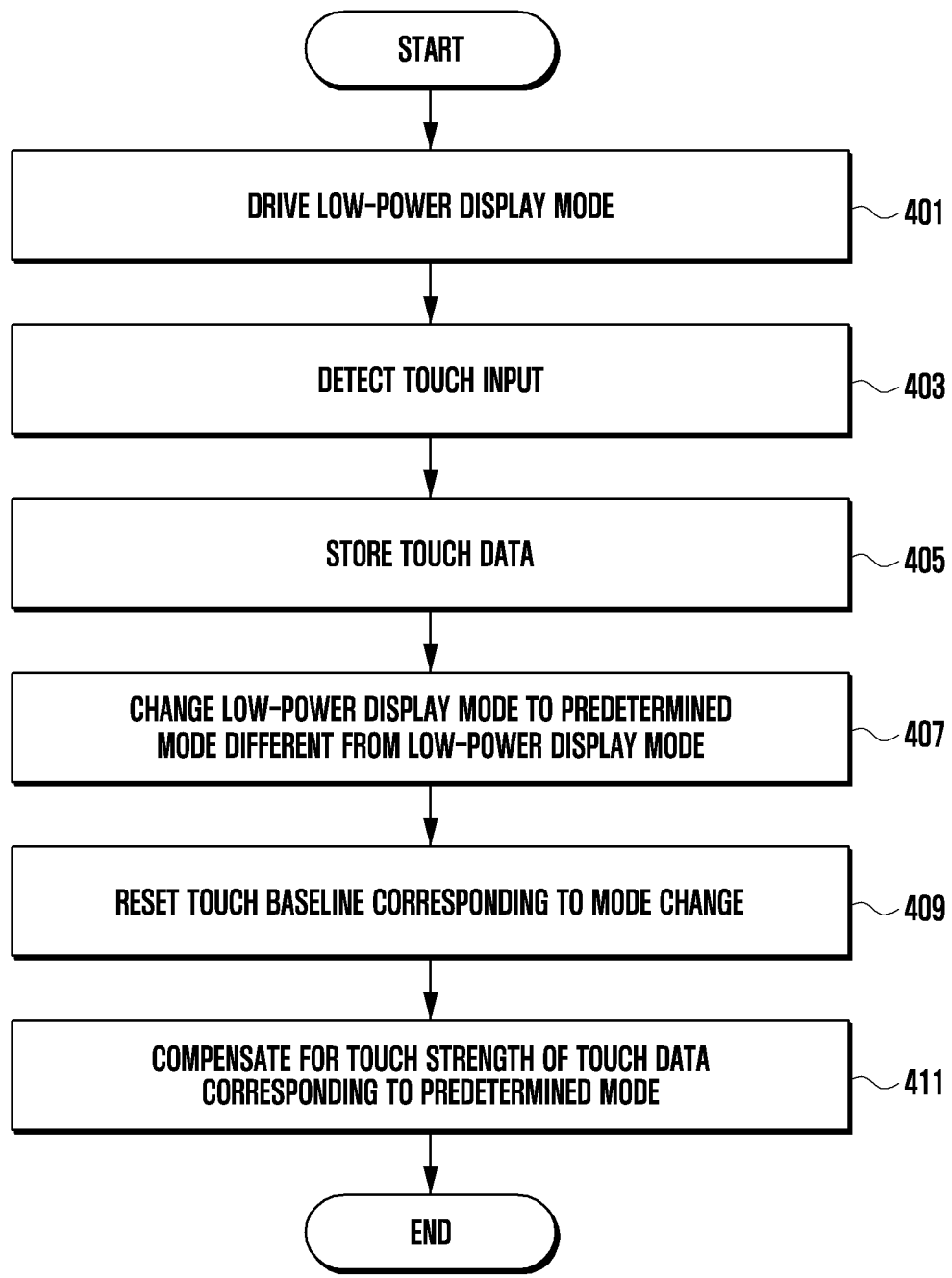
FIG. 4 is a flowchart illustrating a method for determining compensation of touch data based on an operation mode of a display according to various embodiments.

FIG. 4 is a flowchart illustrating a method for compensation of touch data based on display mode switching according to various embodiments.

Referring to FIG. 4, at operation 401, a processor (e.g., processor 120 of FIG. 1) (e.g., display mode control module 310 of FIG. 3) of an electronic device (e.g., electronic device 101 of FIG. 1) may drive a low-power display mode. Based on various embodiments, a display mode may include a low-power display mode or a normal display mode. According to various embodiments, the low-power display mode may include detailed modes. The electronic device is designed to operate limited resources efficiently (e.g., process, memory, or power). Based on various embodiments, if a touch input is not detected for longer than a specified time (e.g., 30 seconds or 1 minute), the electronic device may turn off a display (e.g., display device 160 of FIG. 1), or may reduce battery consumption through switching to a low-power state. The normal display mode corresponds to a display-on state, and may mean a state in which the display device 160 is turned on and is in an activated state. The low-power display mode may include a low-power display state in which the display is driven with luminance that is equal to or lower than a specified range.

According to various embodiments, the electronic device 101 may display information, such as a clock, even in the low-power display state in accordance with the settings of the electronic device 101. Since it becomes more frequent for a user to turn on the display of the electronic device 101 in order to check the time, the electronic device 101 provides a function (e.g., always on display (AOD)) of displaying information, such as clock, calendar, and image, even in a low-power display state. The function of displaying the information in the low-power display state may be provided or may not be provided in accordance with the settings of the electronic device 101. The settings of the electronic device 101 may be changed in accordance with a user input.

According to an embodiment, the low-power display mode may be a case that only some functions (or applications) of the electronic device 101 are activated, and at least one specified kind of function is stopped (or ended). In the low-power display mode, battery consumption of the electronic device 101 may be lower than that in the normal display mode.

At operation 403, the processor 120 (e.g., touch sensing module 320 of FIG. 3) may detect the touch input. If the touch input is detected during the low-power display mode, the processor 120 may determine that the display mode switching has been requested. The display mode switching may mean the switching from the low-power display mode to the normal display mode. According to an embodiment, if the touch input is detected, the processor 120 may provide a user interface as the example illustrated in FIG. 6.

At operation 405, the processor 120 (e.g., touch sensing module 320) may store touch data. The processor 120 may store the touch data corresponding to the touch input detected at operation 403 in a memory (e.g., memory 130 of FIG. 1). The touch data may be a value obtained through digital conversion of a capacitor value being detected through the touch input. Although the capacitor value being detected through the touch input is an analog value, the processor 120 may convert the analog value into a digital value and may store the digital value in the memory 130. The touch data may be stored in the memory 130 in a form including raw data.

At operation 407, the processor 120 (e.g., display mode control module 310) may change the low-power display mode to a predetermined mode that is different from the low-power display mode. The predetermined mode may include the normal display mode. If the touch input is detected in the low-power display mode, the processor 120 may determine that the display mode is changed. The processor 120 may store the touch data corresponding to the detected touch input, and then may change (or switch) the low-power display mode to the normal display mode. According to various embodiments, the operation 407 may be performed before or after operation 409.

At operation 409, the processor 120 (e.g., touch sensing module 320) may reset a touch baseline corresponding to the mode change. The touch baseline may mean a capacitor value related to the detected touch input. The processor 120 may reset the touch baseline after changing the low-power display mode to the normal display mode. During the display mode switching, the processor 120 may reset the touch baseline of the touch sensing module (e.g., touch circuit (e.g., touch circuit 250 of FIG. 2)). Since the electronic device 101 operates with low power in the low-power display mode, the touch strength (or touch data) in the low-power display mode may be different from the touch strength in the normal display mode.

For example, if the capacitor value in the low-power display mode is equal to or larger than "1000", the processor 120 may recognize (or detect) that the touch input has occurred, whereas if the capacitor value being detected in the normal display mode is equal to or larger than "2000", the processor 120 may recognize that the touch input has occurred. If the touch baseline (e.g., capacitor value) is not reset when a display mode is switched, the capacitor value may be distorted, and malfunction may occur by influence of display noises. Accordingly, the processor 120 may reset the touch baseline when the display mode is switched.

At operation 411, the processor 120 (e.g., touch sensing module 320) may compensate for the touch strength (or touch intensity) of the stored touch data corresponding to the predetermined mode. Simultaneously or sequentially, the processor 120 may compensate for the touch strength corresponding to the touch input detected at operation 403. For example, the touch input detected at operation 403 may correspond to a state that is maintained during operation 405 to operation 411. If the touch input is detected at operation 403, the processor 120 determines the display mode switching, and performs operation 405 to operation 411, so that the touch data corresponding to the touch input detected at operation 403 can be applied after the switching to the normal display mode.

According to various embodiments, compensating for the touch strength may include changing a threshold value for determining the touch input being inputted through the touch sensing module 320 as the effective touch input corresponding to the change of the display mode. For example, if the display mode is changed from the low-power display mode to the normal display mode in case that a first threshold value is designated for the low-power display mode and a second threshold value is designated for the normal display mode, an operation of changing the threshold value from the first threshold value to the second threshold value may be performed.

According to various embodiments, since the capacitor value according to the touch input detection in the low-power display mode is different from the capacitor value according to the touch input detection in the normal display mode, the processor 120 may compensate for the capacitor value corresponding to the normal display mode based on the touch data stored in the memory 130. The touch strength compensation may mean changing (e.g. compensation) of the capacitor value in the low-power display mode to the value in the range corresponding to the capacitor value in the normal display mode. For example, in case that the capacitor value for recognizing the same touch input as the touch input in the low-power display mode is "1000", and the capacitor value for recognizing the same touch input as the touch input in the normal display mode is "2000", the processor 120 may control the capacitor value to become "2000" through compensation of the capacitor value as much as "1000" using the touch data stored in the memory 130 after the display mode switching.

According to various embodiments, after the touch strength compensation, the processor 120 may process the touch input (e.g., drag) successively occurring in the touch input (e.g., tap) detected at operation 403 as the effectively gesture. For example, if a touch corresponding to drag and drop is detected after the operation 409 is performed, the processor 120 may perform a function (e.g., application execution) corresponding to the drag and drop.

According to various embodiments, the processor 120 may drive the touch mode differently in the normal display mode and in the low-power display mode. For example, the processor 120 may drive a "normal touch mode" in the normal display mode, and may drive a "low-power touch mode" in the low-power display mode. In the low-power display mode, the processor 120 may save battery consumption as compared with the battery consumption in the normal display mode. According to an embodiment, in the low-power display mode, the processor 120 may reduce the battery consumption by driving the low-power touch mode in the low-power display mode and inactivating the display device 160.

According to various embodiments, the touch strength (or touch data) in the low-power touch mode may be different from the touch intensity in the normal touch mode. Since the electronic device 101 operates with low power in the low-power display mode, the touch intensity (or touch baseline value) in the low-power touch mode may be different from the touch intensity in the normal touch mode. The processor 120 may store the touch data in the low-power display mode, and may compensate for the touch strength corresponding to the normal display mode.

Figure 5:
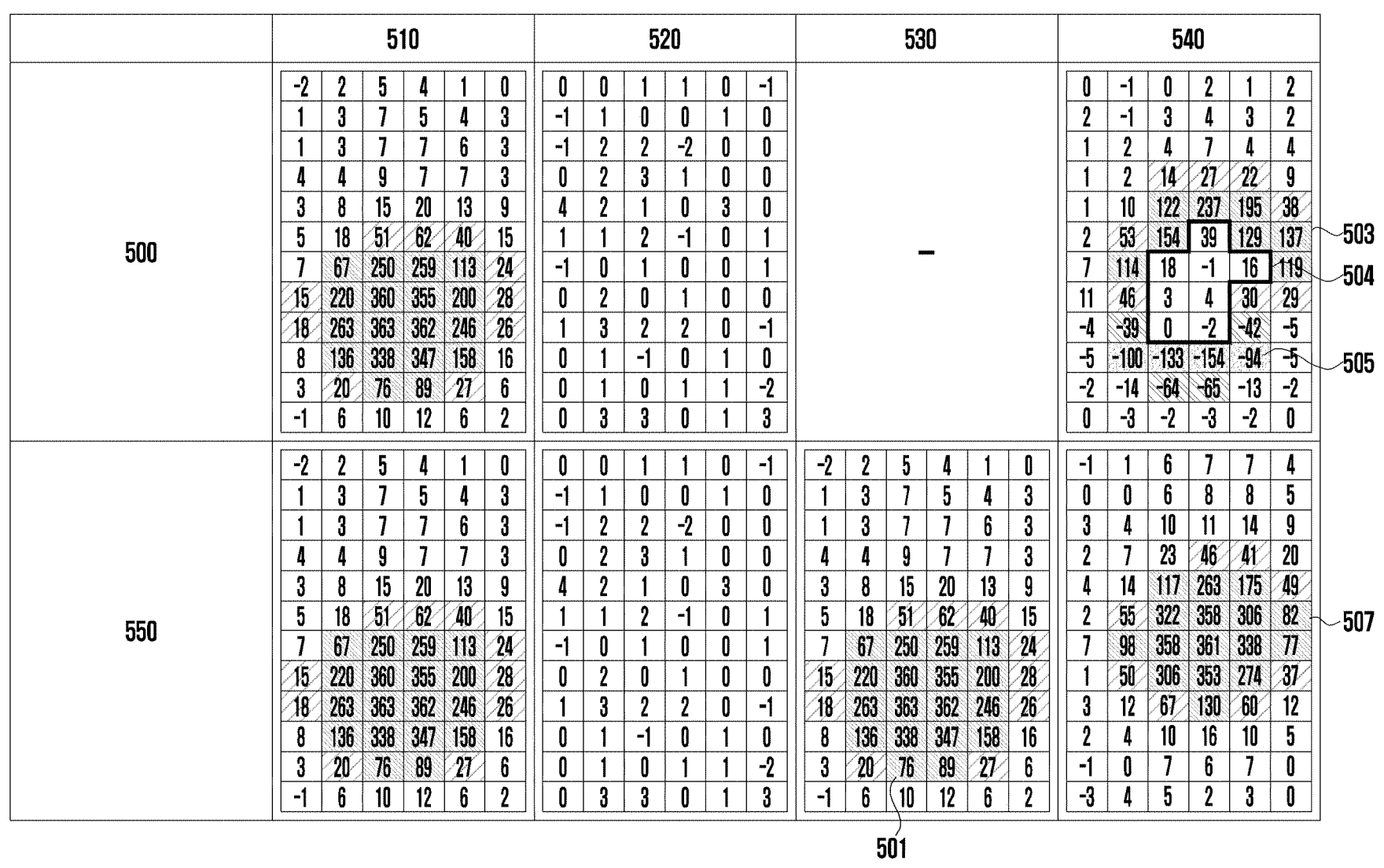

FIG. 5 is a diagram illustrating an example in which an electronic device senses a touch according to a comparative example.

Referring to FIG. 5, touch data according to the disclosure 550 is compared with touch data in the related art 500. First touch data 510 is a capacitor value detected in the low-power display mode, and the first touch data 510 according to the disclosure may be equal to the first touch data 510 in the related art 500. The capacitor value is an analog value, and to help understanding of the disclosure, a value obtained by converting the analog value into a digital value is called "touch data". Second touch data 520 is to reset the touch baseline (e.g., capacitor value), and the second touch data 520 according to the disclosure 550 may be equal to the second touch data in the related art 500. The capacitor value may be affected in accordance with an environment (e.g., ambient temperature). Accordingly, even if the capacitor value is reset, it may not be perfectly reset to "0". If the capacitor value is reset, it may have a value close to "0". Third touch data 530 indicates a capacitor value after the touch baseline reset (e.g., after the display mode switching). In the disclosure 500, the first touch data 510 and the third touch data 530 may be equal to each other through compensation of the capacitor value. According to various embodiments, the touch data (e.g., third touch data 530) after the display mode switching may be equal to the touch data (e.g., first touch data 510) before the display mode switching. Fourth touch data 540 indicates touch data according to a touch drag after the display mode switching. The fourth touch data 540 indicates that the touch data is changed according to the touch drag, and it can be known that the fourth touch data 540 according to the disclosure 550 is different from the fourth touch data 540 in the related art 500 through comparison.

The fourth touch data 540 in the related art 500 indicates that the touch data of a touch detection area (e.g., first touch detection area 501) before the display mode switching is changed to the touch data of a touch detection area (e.g., second touch detection area 503) after the display mode switching according to the touch drag. In the related art 500, detection error areas 504 and 505 may occur due to a recognition error of the first touch detection area 501. In the related art 500, a touch start position (e.g., second detection error area 505) may not be recognized, and a drag partial area (e.g., first detection error area 504) may not be recognized. In contrast, the fourth touch data 540 according to the disclosure 550 indicates that the touch data of the touch detection area (e.g., first touch detection area 501) before the display mode switching is changed to the touch data of a touch detection area (e.g., third touch detection area 507) after the display mode switching according to the touch drag. According to the disclosure 550, it can be known that the touch data is changed from the touch start position according to the touch drag through compensation of the touch data.

Figure 6:
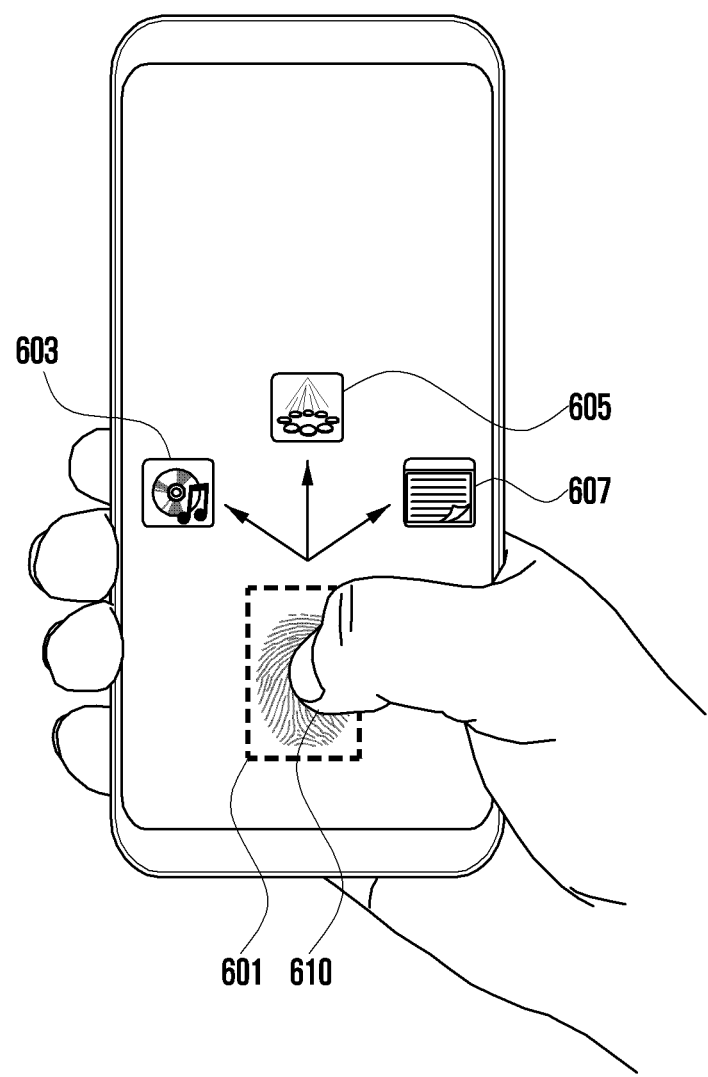
FIG. 6 is a diagram illustrating an example of a user interface receiving a touch input in a low-power display mode according to various embodiments.

FIG. 6 is a diagram illustrating an example of a user interface receiving a touch input in a low-power display mode according to various embodiments.

Referring to FIG. 6, an electronic device (e.g., electronic device 101 of FIG. 1) may provide a function (e.g., quick application execution) of displaying images (e.g., application icons) corresponding to applications 603, 605, and 607 in response to a user input 610 being detected in a low-power display state. If the user input 610 is detected in the low-power display state, a processor 120 may determine that the user input 610 corresponds to display mode switching. If the user input 610 is detected in the low-power display mode, the processor 120 may display images corresponding to at least one application 603, 605, and 607.

According to various embodiments, the electronic device 101 may set a partial area 601 of a display (e.g., display device 160 of FIG. 1) as an area for detecting the user input 610. The electronic device 101 may include a fingerprint sensor or a force sensor (e.g., sensor module 176 of FIG. 1) in the partial area 601. The processor 120 may recognize a user's fingerprint based on the user input 610 being detected in the partial area 601. According to various embodiments, the electronic device 101 may include the sensor module 176 in the partial area 601 of the display device 160, or may include the sensor module 176 in the whole area of the display device 160.

According to various embodiments, if the user input 610 is detected, the processor 120 may store touch data corresponding to the user input 610. Further, the processor 120 may switch the display mode, and may compensate for a touch intensity using the stored touch data. The user input 610 may be maintained during the touch data storing, the display mode switching, and the touch intensity compensation. If movement (e.g., drag) of the user input 610 is detected after the touch intensity compensation, the processor 120 may perform a function (e.g., application execution) corresponding to the movement (e.g., drag and drop) of the user input 610. For example, if the user input 610 moves to the image corresponding to the first application 603 and then is released, the processor 120 may execute the first application 603. The processor 120 may display an execution screen of the first application 603 on the display device 160 after switching to the normal display mode.

According to various embodiments, the processor 120 may set at least one application 603, 605, and 607 based on a usage history or user's settings. The user may set the application to be displayed according to the user input 610 in the low-power display state. For example, the second application 605 and the third application 607 may be set by the user. Further, the processor 120 may set a frequently used application based on the usage history as the application to be display according to the user input 610. For example, the first application 603 may be set by the electronic device based on the usage history.

Figure 7:
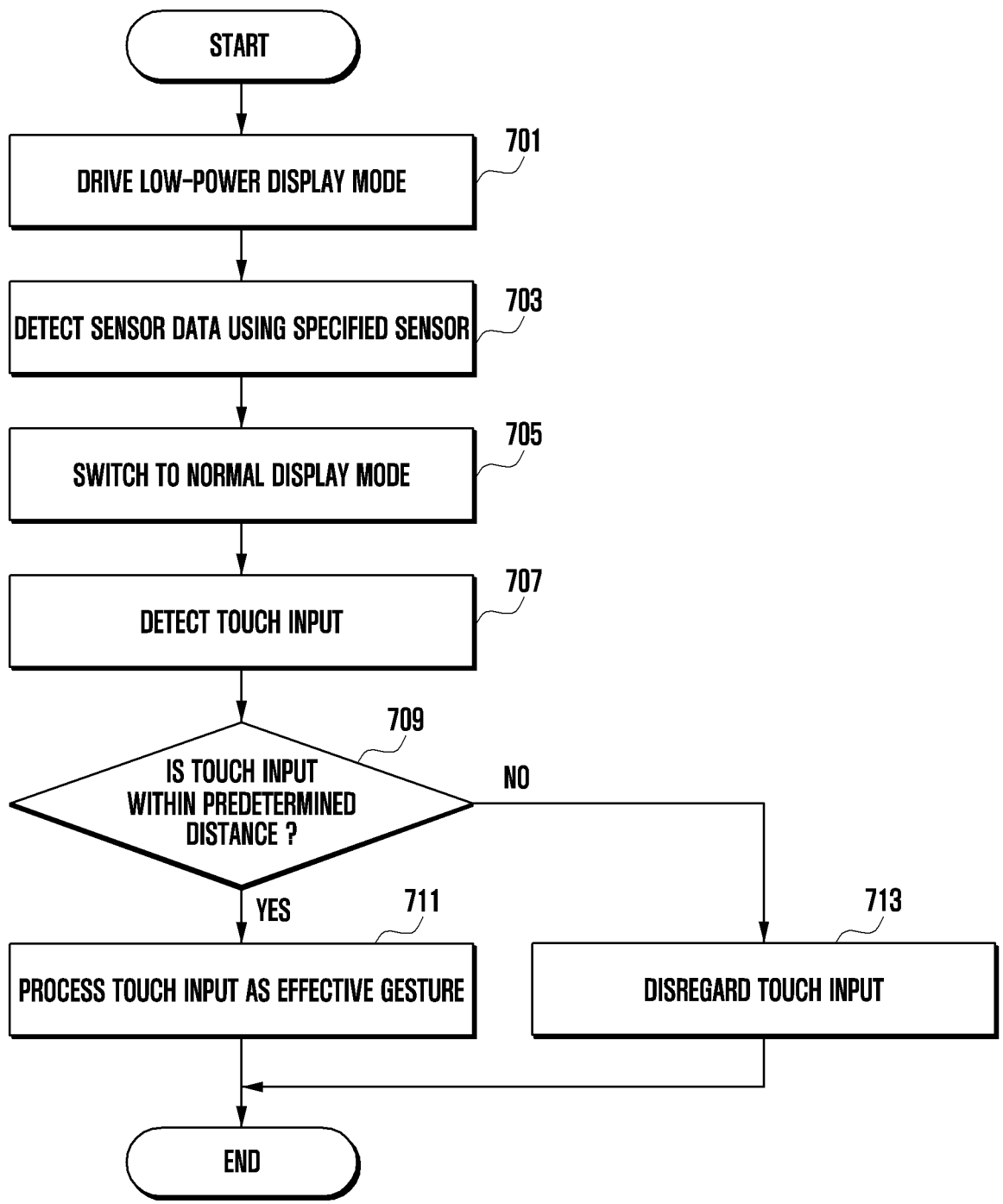
FIGS. 7 and 8 are flowcharts illustrating a method for processing an effective gesture using a specified sensor of an electronic device according to various embodiments.
Figure 8:
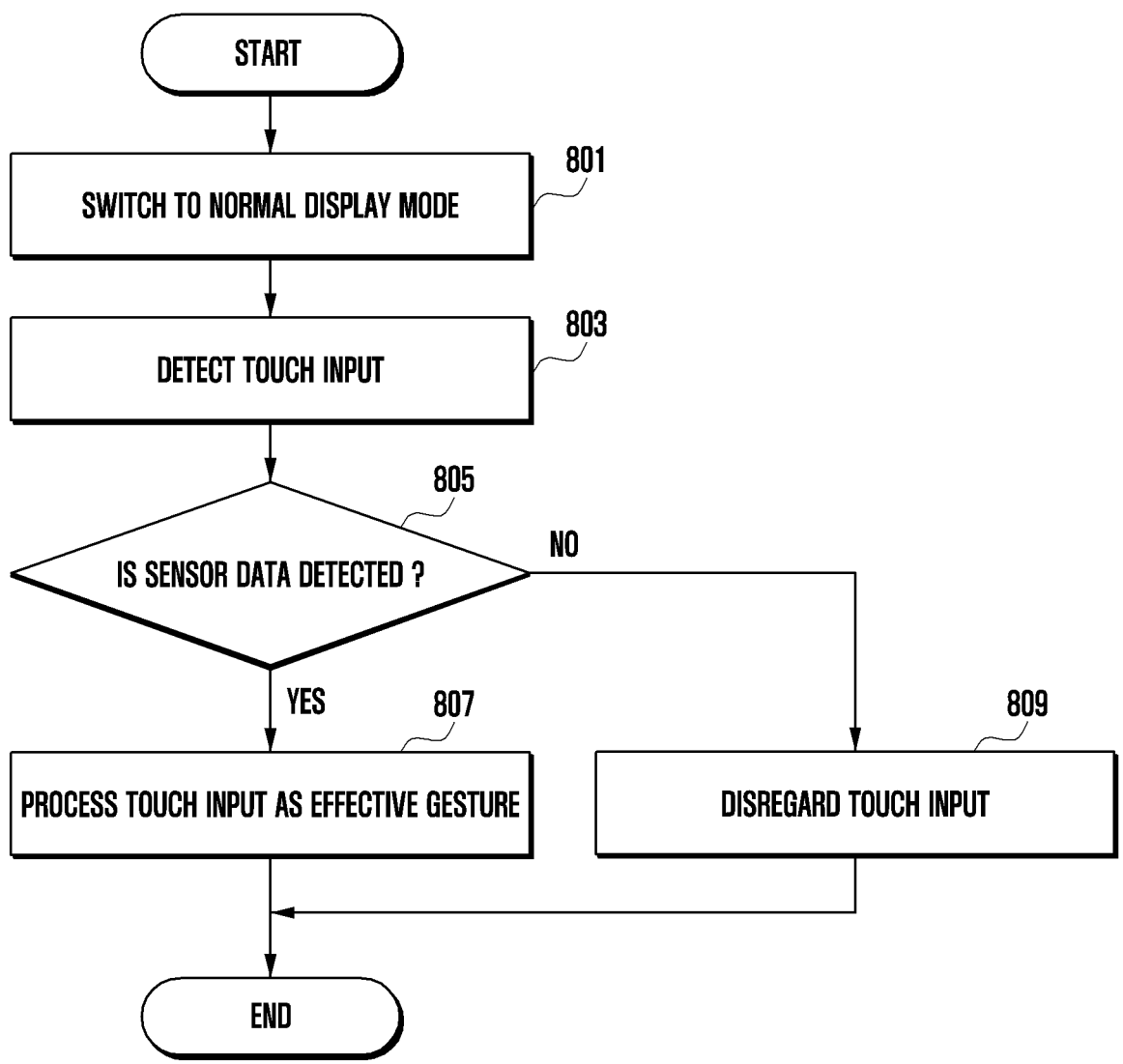

FIGS. 7 and 8 are flowcharts illustrating a method for processing an effective gesture using a specified sensor of an electronic device according to various embodiments.

FIG. 7 is a flowchart illustrating a first method for processing an effective gesture using a specified sensor.

Referring to FIG. 7, at operation 701, a processor (e.g., processor 120 of FIG. 1) (e.g., display mode control module 310 of FIG. 3) of an electronic device (e.g., electronic device 101 of FIG. 1) may drive a low-power display mode. The processor 120 may display information (e.g., clock or calendar) in the low-power display mode, that is, in a low-power display (e.g., display device 160 of FIG. 1) state. In the low-power display mode, the processor 120 may save battery consumption as compared with the battery consumption in a normal display mode. According to an embodiment, the processor 120 may reduce the battery consumption by driving the touch mode as the low-power touch mode, turning off the display device 160, or switching the display device 160 to the lower-power state.

At operation 703, the processor 120 (e.g., sensor control module 340 of FIG. 3) may detect sensor data using a specified sensor. The specified sensor means a fingerprint sensor or a force sensor, and may be the sensor module 176 of FIG. 1. The electronic device 101 may include the sensor module 176 in the whole area of the display (e.g., display device 160 of FIG. 1) or in a partial area (e.g., partial area 601 of FIG. 5) of the display device 160. If sensor data is detected through the specified sensor during the low-power display mode, the processor 120 may determine that a user requests display mode switching. According to an embodiment, if the sensor data is detected, the processor 120 may provide the user interface of FIG. 6.

At operation 705, the processor 120 (e.g., display mode control module 310) may switch the display mode to a normal display mode. In the low-power display mode, the processor 120 may switch (or change) the display mode to the normal display mode. Simultaneously with or before/after the switching to the normal display mode, the processor 120 may reset a touch baseline. The sensor data may not be reset even after the switching to the normal display mode.

At operation 707, the processor 120 (e.g., touch sensing module 320 of FIG. 3) may detect a touch input. Since the touch baseline is reset during the switching to the normal display mode, the processor 120 may detect the touch input being detected thereafter. For example, the touch input may correspond to movement (e.g., drag) of the sensor data from the detected position.

At operation 709, the processor 120 (e.g., gesture processing module 330 of FIG. 3) may determine whether the touch input is within a predetermined distance. The processor 120 may determine whether a start position of the touch input is within the predetermined distance from the detected position. Since the touch input occurring during the low-power display mode is reset, an error may occur in the start position of the touch input detected after the switching from the low-power display mode to the normal display mode. Since the sensor data is not reset differently from the touch input, the processor 120 may determine the effectiveness of the touch input using the sensor data even after the switching to the normal display mode. If the touch input is within the predetermined distance from the position where the sensor data is detected (YES), the processor 120 may perform an operation 711, whereas if the touch input is not within the predetermined distance from the position where the sensor data is detected (NO), the processor 120 may perform an operation 713.

If the touch input is within the predetermined distance from the position where the sensor data is detected (YES), the processor 120 (gesture processing module 330), at operation 711, may process the touch input as the effective gesture. If the start position of the touch input is within the predetermined distance (e.g., 0.5 cm) from the position where the sensor data is detected, the processor 120 may determine that the error has occurred in the start position of the touch input. The processor 120 may determine that the touch input is a series of intentional actions, and may process the touch input as the effective gesture. For example, if the touch input detected at operation 707 is released (e.g., drag and drop) after a drag, the processor 120 may perform a function (e.g., application execution) corresponding to the drag and drop.

If the touch input is not within the predetermined distance from the position where the sensor data is detected (NO), the processor 120 (gesture processing module 330), at operation 713, may disregard the touch input. If the start position of the touch input is not within the predetermined distance (e.g., 1 cm) from the position where the sensor data is detected, the processor 120 may determine that the touch input is not a series of intentional actions, and may disregard the touch input. According to an embodiment, if the touch input is not within the predetermined distance from the position where the sensor data is detected, the processor 120 may determine effectiveness of the touch input based on the position where the touch input detected at operation 707 is released.

FIG. 8 is a flowchart illustrating a second method for processing an effective gesture using a specified sensor.

Referring to FIG. 8, at operation 801, a processor (e.g., processor 120 of FIG. 1) (e.g., display mode control module 310 of FIG. 3) of an electronic device (e.g., electronic device 101 of FIG. 1) may switch the display mode to a normal display mode. In the low-power display mode, the processor 120 may switch (or change) the display mode to the normal display mode. The processor 120 may reset a touch baseline. If a touch input occurs during the low-power display mode, the processor 120 may switch the display mode to the normal display mode. Further, if sensor data is detected using a specified sensor (e.g., fingerprint sensor or force sensor) during the low-power display mode, the processor 120 may switch the display mode to the normal display mode.

At operation 803, the processor 120 (e.g., touch sensing module 320 of FIG. 3) may detect a touch input. Since the touch baseline is reset during the switching to the normal display mode, the processor 120 may detect the touch input being detected thereafter.

At operation 805, the processor 120 (e.g., sensor control module 340 of FIG. 3) may determine whether sensor data is detected. The processor 120 may detect the sensor data using the specified sensor. The specified sensor means the fingerprint sensor or the force sensor, and may be the sensor module 176 of FIG. 1. The processor 120 may determine whether the sensor data is effective after the switching to the normal display mode. For example, since the sensor data is not reset even after the display mode switching, the processor 120 may determine whether the sensor data is detected even after the switching to the normal display mode. If the sensor data is detected (YES), the processor 120 may perform an operation 807, whereas if the sensor data is not detected (NO), the processor 120 may perform an operation 809.

If the sensor data is detected (YES), the processor 120 (e.g., gesture processing module 330 of FIG. 3), at operation 807, may process the touch input as an effective gesture. If the sensor data is detected even after the switching to the normal display mode, the processor 120 may determine that the touch input is a series of intentional actions, and may process the touch input as the effective gesture. The processor 120 may perform a function based on movement of the touch input from the position where the sensor data is detected. For example, if the touch input detected at operation 803 is released (e.g., drag and drop) after a drag, the processor 120 may perform a function (e.g., application execution) corresponding to the drag and drop.

If the sensor data is not detected (NO), the processor 120 (gesture processing module 330), at operation 809, may disregard the touch input. If the sensor data is not detected after the switching to the normal display mode, the processor 120 may determine that the touch input is not a series of intentional actions, and may disregard the touch input.

Figure 9:
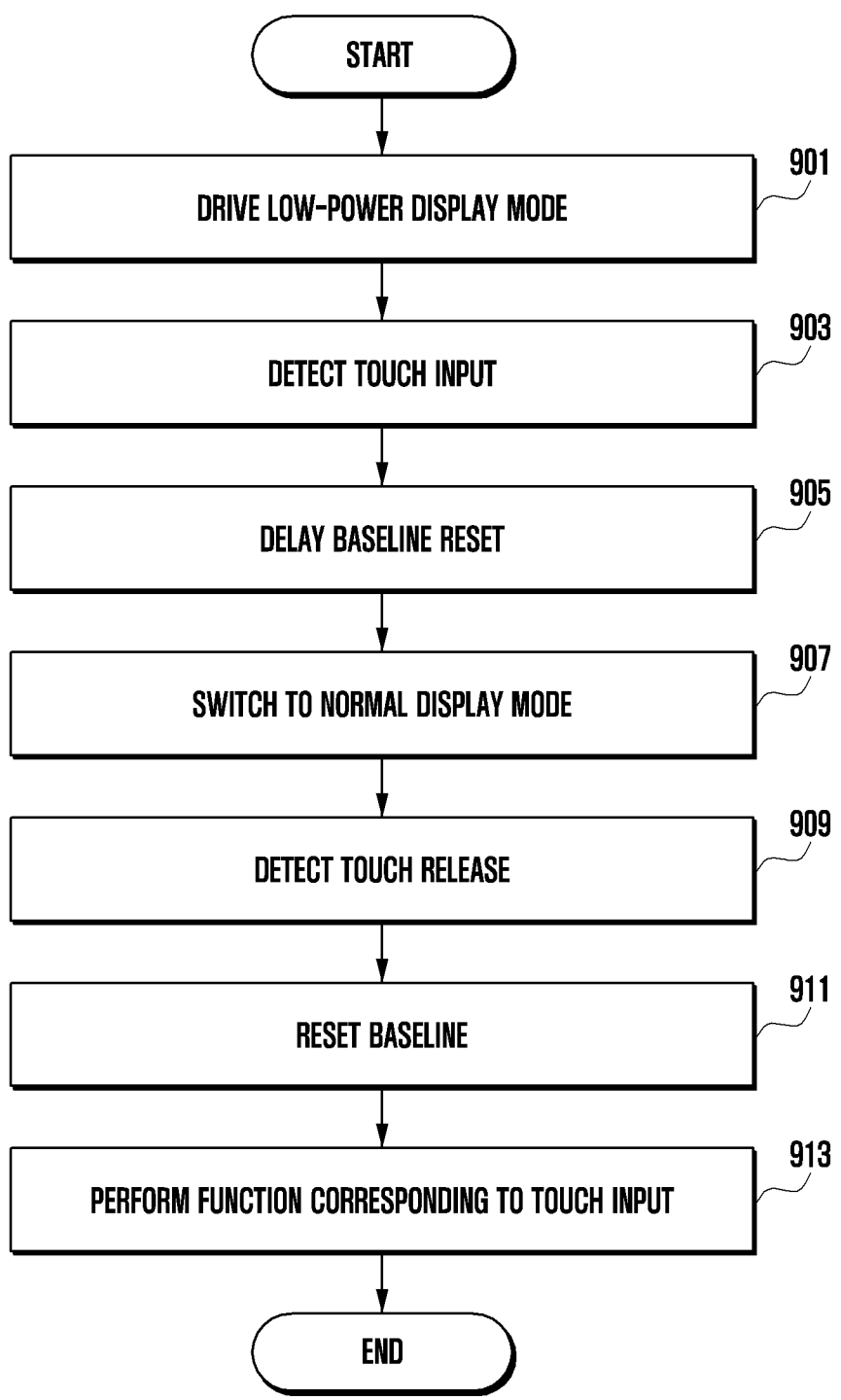
FIG. 9 is a flowchart illustrating a method for switching a display mode based on a touch release of an electronic device according to various embodiments.

FIG. 9 is a flowchart illustrating a method for switching a display mode based on a touch release of an electronic device according to various embodiments.

Referring to FIG. 9, at operation 901, a processor (e.g., processor 120 of FIG. 1) (e.g., display mode control module 310 of FIG. 3) of an electronic device (e.g., electronic device 101 of FIG. 1) may drive a low-power display mode. The processor 120 may drive a touch mode as a low-power touch mode in the low-power display mode. Since the operation 901 is the same as or similar to the operation 401, the detailed explanation thereof may be omitted.

At operation 903, the processor 120 (e.g., touch sensing module 320 of FIG. 3) may detect a touch input. If the touch input is detected in the low-power display mode, the processor 120 may determine that a user has requested the display mode switching. Since the operation 903 is the same as or similar to the operation 403, the detailed explanation thereof may be omitted.

At operation 905, the processor 120 (e.g., touch sensing module 320) may delay the baseline reset. Since the baseline (e.g., capacitor value) differs according to the display mode, it is necessary for the processor 120 to reset the baseline when the display mode is switched. However, the processor 120 may delay the baseline reset until the touch input detected at operation 903 is released. The processor 120 may extend the baseline reset time.

At operation 907, the processor 120 (e.g., display mode control module 310) may switch the display mode to the normal display mode. The processor 120 may switch the low-power display mode to the normal display mode. Since the operation 907 is the same as or similar to the operation 705 of FIG. 7, the detailed explanation thereof may be omitted.

At operation 909, the processor 120 (e.g., touch sensing module 320) may detect a touch release. The processor 120 may detect the release of the touch input detected at operation 903.

At operation 911, the processor 120 (e.g., touch sensing module 320) may reset the baseline. The processor 120 may reset the baseline simultaneously with the touch release or sequentially. If the baseline is reset, the processor 120, the value corresponding to the touch input detected at operation 903 may be deleted.

At operation 913, the processor 120 (e.g., gesture processing module 330 of FIG. 3) may perform a function based on the touch input. For example, if the touch input detected at operation 903 is released from an image (e.g., icon) corresponding to a second application (e.g., second application 605 of FIG. 6) after a drag, the processor 120 may execute the second application 605. The processor 120 may display an execution screen of the second application 605 on the display (e.g., display device 160 of FIG. 1).

Figure 10:
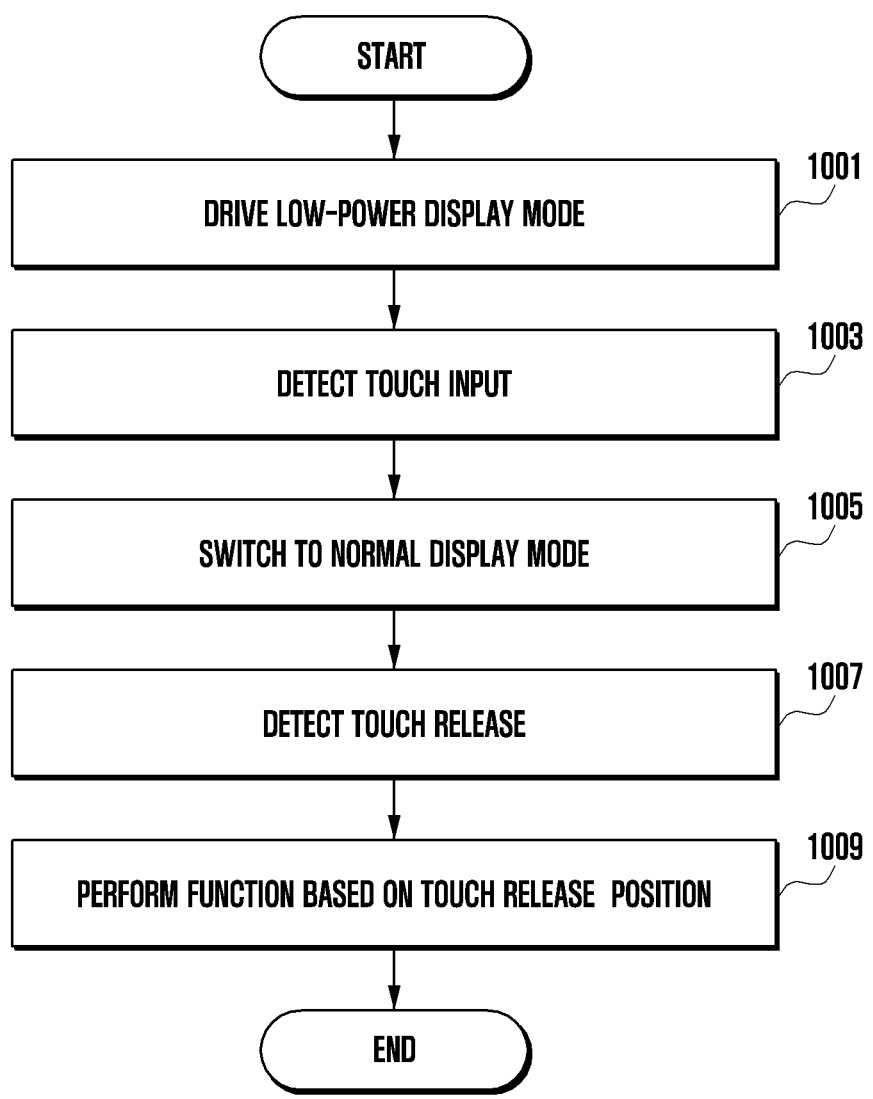
FIG. 10 is a flowchart illustrating a method for performing a function based on a touch release position of an electronic device according to various embodiments.

FIG. 10 is a flowchart illustrating a method for performing a function based on a touch release position of an electronic device according to various embodiments.

Referring to FIG. 10, at operation 1001, a processor (e.g., processor 120 of FIG. 1) (e.g., display mode control module 310 of FIG. 3) of an electronic device (e.g., electronic device 101 of FIG. 1) may drive a low-power display mode. The processor 120 may drive a touch mode as a low-power touch mode in the low-power display mode. Since the operation 1001 is the same as or similar to the operation 401, the detailed explanation thereof may be omitted.

At operation 1003, the processor 120 (e.g., touch sensing module 320 of FIG. 3) may detect a touch input. If the touch input is detected in the low-power display mode, the processor 120 may determine that a user has requested the display mode switching. Since the operation 1003 is the same as or similar to the operation 403, the detailed explanation thereof may be omitted.

At operation 1005, the processor 120 (e.g., display mode control module 310) may switch the display mode to the normal display mode. The processor 120 may switch (or change) the low-power display mode to the normal display mode. Simultaneously, previously, or sequentially, the processor 120 may reset the touch baseline.

At operation 1007, the processor 120 (e.g., touch sensing module 320) may detect a touch release. The processor 120 may detect the release of the touch input detected at operation 1003. Since the processor 120 resets the touch baseline during the switching to the normal display mode, an error may occur in the touch input detected at operation 1003. The processor 120 may wait until the detected touch input is released to perform a function.

At operation 1009, the processor 120 (e.g., gesture processing module 330 of FIG. 3) may perform a function based on the touch-released position. The processor 120 may perform the function based on the position where the touch input detected at operation 1003 is released.

Figure 11:
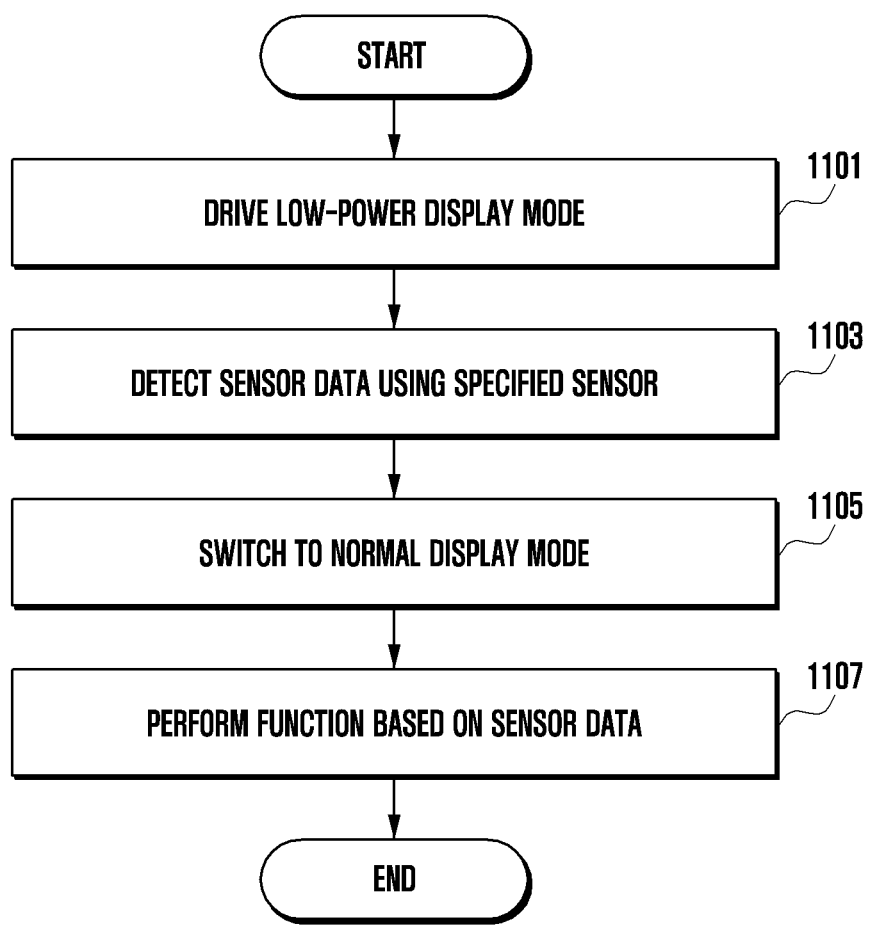
FIG. 11 is a flowchart illustrating a method for performing a function using a specified sensor of an electronic device according to various embodiments.

FIG. 11 is a flowchart illustrating a method for performing a function using a specified sensor of an electronic device according to various embodiments.

Referring to FIG. 11, at operation 1101, a processor (e.g., processor 120 of FIG. 1) (e.g., display mode control module 310 of FIG. 3) of an electronic device (e.g., electronic device 101 of FIG. 1) may drive a low-power display mode. According to an embodiment, the processor 120 may display information (e.g., clock or calendar) in the low-power display mode, that is, in a low-power display (e.g., display device 160 of FIG. 1) state.

At operation 1103, the processor 120 (e.g., sensor control module 340 of FIG. 3) may detect sensor data using a specified sensor. The specified sensor means a fingerprint sensor or a force sensor, and may be the sensor module 176 of FIG. 1. If the sensor data is detected through the specified sensor during the low-power display mode, the processor 120 may determine that a user has requested the display mode switching. According to an embodiment, if the sensor data is detected, the processor 120 may provide a user interface of FIG. 5.

At operation 1105, the processor 120 (e.g., display mode control module 310) may switch the display mode to a normal display mode. The processor 120 may switch (or change) the display mode from the low-power display mode to the normal display mode. The processor 120 may reset a touch base line.

At operation 1107, the processor 120 (e.g., gesture processing module 330 of FIG. 3) may perform a function based on the sensor data. The sensor data may not be reset even after the switching to the normal display mode. For example, the processor 120 may display an execution screen of a third application 607 on the display (e.g., display device 160 of FIG. 1) based on the sensor data.

According to various embodiments, a method for operating an electronic device (e.g., electronic device 101 of FIG. 1) may include driving a low-power display mode, detecting a touch input; storing touch data corresponding to the detected touch input, changing the low-power display mode to a predetermined mode different from the low-power display mode, resetting a touch baseline corresponding to the mode change, and compensating for a touch strength of the stored touch data at least based on the predetermined mode.

The predetermined mode may include a normal display mode, and the method may further include switching the low-power display mode to the normal display mode after storing the touch data.

The compensating may include changing a capacitor value in the low-power display mode to a value in a range corresponding to a capacitor value in the predetermined mode based on the touch data.

The method may further include performing a function based on a touch gesture being input after the touch strength is compensated for.

The method may further include switching the low-power display mode to the predetermined mode in case that the detected touch input is released.

The resetting may further include delaying the touch baseline reset in case that the touch input is detected while driving the low-power display mode, and resetting the touch baseline in case that the detected touch input is released.

The method may further include switching the low-power display mode to the predetermined mode in case that the touch input is detected while driving the low-power display mode, and performing a function based on the released position in case that the detected touch input is released.

The method may further include switching the low-power display mode to the predetermined mode in case that the sensor data is detected while driving the low-power display mode, and performing a function based on the sensor data.

The method may further include detecting the touch input after the switching to the predetermined mode, processing the touch input as an effective gesture in case that the detected touch input is within a predetermined distance, and performing a function corresponding to the effective gesture.

Various embodiments of the disclosure that are disclosed in the specification and drawings are merely for easy explanation of the technical contents of the disclosure and proposal of specific examples to help understanding of the disclosure, but are not intended to limit the scope of the disclosure. Accordingly, it should be construed that all changes or modifications derived based on the technical concept of the disclosure are included in the scope of the disclosure in addition to the embodiments disclosed herein.

The invention claimed is:

1. An electronic device comprising:
   a touch sensing module;
   a memory; and
   a processor,
   wherein the processor is configured to:
      detect a touch input while driving a low-power display mode,
      store, in the memory, touch data corresponding to the detected touch input,
      change the low-power display mode to a predetermined mode different from the low-power display mode,
      reset a touch baseline of the touch sensing module corresponding to the mode change,
      compensate for a touch strength of the stored touch data at least based on the predetermined mode, and
      change a capacitor value in the low-power display mode to a value in a range corresponding to a capacitor value in the predetermined mode based on the touch data.

2. The electronic device of claim 1,
   wherein the predetermined mode comprises a normal display mode, and
   wherein the processor is configured to switch the low-power display mode to the normal display mode after storing the touch data.

3. The electronic device of claim 1, wherein the processor is configured to perform a function based on a touch gesture being input after the touch strength is compensated for.

4. The electronic device of claim 1, wherein the processor is configured to switch the low-power display mode to the predetermined mode in case that the detected touch input is released.

5. The electronic device of claim 1, wherein the processor is configured to:
   delay the touch baseline reset when the touch input is detected; and
   reset the touch baseline when the detected touch input is released.

6. The electronic device of claim 1, wherein the processor is configured to:
   switch the low-power display mode to the predetermined mode when the touch input is detected; and
   perform a function based on the released position when the detected touch input is released.

7. The electronic device of claim 1, further comprising a sensor,
   wherein the processor is configured to:
      detect sensor data using the sensor while driving the low-power display mode,
      switch the low-power display mode to a normal display mode, and
      perform a function based on the sensor data.

8. The electronic device of claim 7, wherein the processor is configured to:
   detect the touch input after switching to the normal display mode; and
   process the touch input as an effective gesture based on whether the touch input is within a predetermined distance from the sensor data.

9. The electronic device of claim 8, wherein the processor is configured to:
- process the touch input as the effective gesture in case that the touch input is within the predetermined distance from the sensor data; and
- perform a function corresponding to the effective gesture.

10. The electronic device of claim 7, wherein the processor is configured to:
- detect the touch input after switching to the normal display mode; and
- process the touch input as an effective gesture based on whether the sensor data is detected.

11. A method for operating an electronic device, the method comprising:
- driving a low-power display mode;
- detecting a touch input;
- storing touch data corresponding to the detected touch input;
- changing the low-power display mode to a predetermined mode different from the low-power display mode;
- resetting a touch baseline corresponding to the mode change; and
- compensating for a touch strength of the stored touch data at least based on the predetermined mode,
- wherein compensating comprises changing a capacitor value in the low-power display mode to a value in a range corresponding to a capacitor value in the predetermined mode based on the touch data.

12. The method of claim 11,
- wherein the predetermined mode includes a normal display mode, and
- wherein the method further comprises switching the low-power display mode to the normal display mode after storing the touch data.

13. The method of claim 11, further comprising performing a function based on a touch gesture being input after the touch strength is compensated for.

* * * * *